(12) United States Patent
DiGiovanni

(10) Patent No.: US 9,034,062 B2
(45) Date of Patent: May 19, 2015

(54) METHODS OF FORMING POLYCRYSTALLINE COMPACTS

(75) Inventor: Anthony A. DiGiovanni, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 867 days.

(21) Appl. No.: 13/095,348

(22) Filed: Apr. 27, 2011

(65) Prior Publication Data
US 2011/0258936 A1  Oct. 27, 2011

Related U.S. Application Data

(60) Provisional application No. 61/328,434, filed on Apr. 27, 2010.

(51) Int. Cl.
| | | |
|---|---|---|
| *B24D 18/00* | (2006.01) | |
| *B24D 3/00* | (2006.01) | |
| *E21B 10/567* | (2006.01) | |
| *B24D 3/14* | (2006.01) | |
| *B24D 99/00* | (2010.01) | |
| *C22C 26/00* | (2006.01) | |

(52) U.S. Cl.
CPC .............. *E21B 10/567* (2013.01); *B24D 3/14* (2013.01); *B24D 18/00* (2013.01); *B24D 99/005* (2013.01); *C22C 26/00* (2013.01)

(58) Field of Classification Search
USPC ..................................... 175/428, 432; 51/293
See application file for complete search history.

(56) References Cited

U.S. PATENT DOCUMENTS

| | | |
|---|---|---|
| 3,673,154 A | 6/1972 | Trevillyan |
| 3,745,623 A | 7/1973 | Wentorf, Jr. et al. |
| 4,361,472 A | 11/1982 | Morrison, Jr. |
| 4,490,298 A | 12/1984 | Feld |
| 4,494,620 A | 1/1985 | Knothe et al. |
| 4,995,887 A | 2/1991 | Barr et al. |
| 5,127,923 A | 7/1992 | Bunting et al. |
| 5,747,395 A | 5/1998 | Smith et al. |
| 5,954,147 A | 9/1999 | Overstreet et al. |
| 6,410,085 B1 | 6/2002 | Griffin et al. |
| 6,435,058 B1 | 8/2002 | Matthias et al. |

(Continued)

FOREIGN PATENT DOCUMENTS

WO  WO9509131 A1  4/1995

OTHER PUBLICATIONS

Conrads et al., Plasma Generation and Plasma Sources, Plasma Sources Sci. Technol., vol. 9 (2002), pp. 441-454.

(Continued)

*Primary Examiner* — Pegah Parvini
(74) *Attorney, Agent, or Firm* — TraskBritt

(57) ABSTRACT

Methods of forming a polycrystalline compact for use in an earth-boring tool include sintering a plurality of hard particles with catalyst material to form a polycrystalline material that includes a plurality of inter-bonded particles of hard material integrally formed with the catalyst material and introducing at least a portion of the polycrystalline material to a reactive material to remove at least a portion of the catalyst material contained within the polycrystalline material. The reactive material may include at least one of a molten glass, an ionic compound, a leaching liquor, and a chemical plasma. The reactive material may be introduced to the polycrystalline material at a temperature of greater than or equal to a melting point thereof.

14 Claims, 4 Drawing Sheets

(56) References Cited

U.S. PATENT DOCUMENTS

| | | |
|---|---|---|
| 6,481,511 B2 | 11/2002 | Matthias et al. |
| 6,544,308 B2 | 4/2003 | Griffin et al. |
| 6,562,462 B2 | 5/2003 | Griffin et al. |
| 6,566,462 B2 | 5/2003 | Murray et al. |
| 6,585,064 B2 | 7/2003 | Griffin et al. |
| 6,589,640 B2 | 7/2003 | Griffin et al. |
| 6,592,985 B2 | 7/2003 | Griffin et al. |
| 6,601,662 B2 | 8/2003 | Matthias et al. |
| 6,739,214 B2 | 5/2004 | Griffin et al. |
| 6,749,033 B2 | 6/2004 | Griffin et al. |
| 6,772,849 B2 | 8/2004 | Oldham et al. |
| 6,797,326 B2 | 9/2004 | Griffin et al. |
| 6,861,098 B2 | 3/2005 | Griffin et al. |
| 6,861,137 B2 | 3/2005 | Griffin et al. |
| 6,878,447 B2 | 4/2005 | Griffin et al. |
| 2005/0115744 A1 | 6/2005 | Griffin et al. |
| 2005/0129950 A1 | 6/2005 | Griffin et al. |
| 2006/0060392 A1 | 3/2006 | Eyre |
| 2006/0157276 A1 | 7/2006 | Carothers et al. |
| 2006/0266559 A1 | 11/2006 | Keshavan et al. |
| 2007/0056776 A1 | 3/2007 | Overstreet |
| 2007/0079994 A1* | 4/2007 | Middlemiss .................. 175/426 |
| 2007/0169419 A1 | 7/2007 | Davis et al. |
| 2007/0202254 A1 | 8/2007 | Ganguli et al. |
| 2007/0278017 A1 | 12/2007 | Shen et al. |
| 2009/0090563 A1 | 4/2009 | Voronin et al. |
| 2009/0152018 A1* | 6/2009 | Sani ............................. 175/432 |
| 2010/0084197 A1 | 4/2010 | Voronin et al. |
| 2011/0023375 A1 | 2/2011 | Sani et al. |
| 2011/0036643 A1 | 2/2011 | Belnap et al. |

OTHER PUBLICATIONS

International Preliminary Report on Patentability for Interational Application No. PCT/US2011/034125 dated Oct. 30, 2012, 4 pages.

Ishida et al., The Co-Ge (Cobalt-Germanium) System, Journal of Phase Equilibria, vol. 12, No. 1, pp. 77-83 (1991).

Xu et al., Liquid Metal Extraction of Nd From NdFeB Magnet Scrap, J. Mater. Res., vol. 15, No. 11, Nov. 2000, pp. 2296-2304.

International Search Report for International Application No. PCT/US2011/034125 mailed Oct. 26, 2011, 3 pages.

International Written Opinion for International Application No. PCT/US2011/034125 mailed Oct. 26, 2011, 3 pages.

Borom et al., Reactions Between Metallic Iron and cobalt Oxide-Bearing Sodium Disilicate Glass, Journal of the American Ceramic Society, 50 [2], 1967 pp. 61-66, February 21.

Notis, M. R.,"Decarburization of an Iron-Nickel_Cobalt Glass Sealing Alloy," Journal of the American Ceramic Society, 45 [9], 1962 pp. 412-416.

Yokota, "Dissolution of Manganese and Cobalt and Their Deposition on Type 304 Stainless Steel in Liquid Sodium," Yokota, N, Shimoyashiki, S, J. Jpn. Inst. Met. vol. 53, No. 2, pp. 175-182.

* cited by examiner

METHODS OF FORMING POLYCRYSTALLINE COMPACTS

CROSS-REFERENCE TO RELATED APPLICATION

This application claims the benefit of U.S. Provisional Patent Application Ser. No. 61/328,434, filed Apr. 27, 2010, the disclosure of which is hereby incorporated herein in its entirety by this reference.

TECHNICAL FIELD

Embodiments of the present disclosure generally relate to methods of forming such polycrystalline diamond compact cutting elements for earth-boring tools.

BACKGROUND

Earth-boring tools for forming wellbores in subterranean earth formations generally include a plurality of cutting elements secured to a body. For example, fixed-cutter earth-boring rotary drill bits (also referred to as "drag bits") include a plurality of cutting elements that are fixedly attached to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit. In other words, earth-boring tools typically include a bit body to which cutting elements are attached.

The cutting elements used in such earth-boring tools often include polycrystalline diamond compacts (often referred to as "polycrystalline diamond compact"), which act as cutting faces of a polycrystalline diamond material. Polycrystalline diamond material is material that includes inter-bonded grains or crystals of diamond material. In other words, polycrystalline diamond material includes direct, inter-granular bonds between the grains or crystals of diamond material. The terms "grain" and "crystal" are used synonymously and interchangeably herein.

Polycrystalline diamond compact cutting elements are typically formed by sintering and bonding together relatively small diamond grains under conditions of high temperature and high pressure in the presence of a catalyst (e.g., cobalt, iron, nickel, or alloys and mixtures thereof) to form a layer (e.g., a compact or "table") of polycrystalline diamond material on a cutting element substrate. These processes are often referred to as high temperature/high pressure (HTHP) processes. The cutting element substrate may comprise a cermet material (i.e., a ceramic-metal composite material) such as, for example, cobalt-cemented tungsten carbide. In such instances, the cobalt (or other catalyst material) in the cutting element substrate may be swept into the diamond grains during sintering and serve as the catalyst material for forming the inter-granular diamond-to-diamond bonds, and the resulting diamond table, from the diamond grains. In other methods, powdered catalyst material may be mixed with the diamond grains prior to sintering the grains together in an HTHP process.

Upon formation of a diamond table using an HTHP process, catalyst material may remain in interstitial spaces between the grains of diamond in the resulting polycrystalline diamond compact. The presence of the catalyst material in the diamond table may contribute to thermal damage in the diamond table when the cutting element is heated during use, due to friction at the contact point between the cutting element and the formation.

Polycrystalline diamond compact cutting elements in which the catalyst material remains in the polycrystalline diamond compact are generally thermally stable up to a temperature in a range of about from about seven hundred fifty degrees Celsius (750° C.), although internal stress within the cutting element may begin to develop at temperatures exceeding about three hundred fifty degrees Celsius (350° C.). This internal stress is at least partially due to differences in the rates of thermal expansion between the diamond table and the cutting element substrate to which it is bonded. This differential in thermal expansion rates may result in relatively large compressive and tensile stresses at the interface between the diamond table and the substrate, and may cause the diamond table to delaminate from the substrate. At temperatures of about seven hundred fifty degrees Celsius (750° C.) and above, stresses within the diamond table itself may increase significantly due to differences in the coefficients of thermal expansion of the diamond material and the catalyst material within the diamond table. For example, cobalt thermally expands significantly faster than diamond, which may cause cracks to form and propagate within the diamond table, eventually leading to deterioration of the diamond table and ineffectiveness of the cutting element.

Furthermore, at temperatures at or above about seven hundred fifty degrees Celsius (750° C.), some of the diamond crystals within the polycrystalline diamond compact may react with the catalyst material causing the diamond crystals to undergo a chemical breakdown or back-conversion to another allotrope of carbon or another carbon-based material. For example, the diamond crystals may graphitize at the diamond crystal boundaries, which may substantially weaken the diamond table. In addition, at extremely high temperatures, in addition to graphite, some of the diamond crystals may be converted to carbon monoxide and carbon dioxide.

In order to reduce the problems associated with differential rates of thermal expansion and chemical breakdown of the diamond crystals in polycrystalline diamond compact PDC cutting elements, so-called "thermally stable" polycrystalline diamond compacts (which are also known as thermally stable products, or "TSPs") have been developed. Such a thermally stable polycrystalline diamond compact may be formed by leaching the catalyst material (e.g., cobalt) out from interstitial spaces between the inter-bonded diamond crystals in the diamond table using, for example, an acid or combination of acids (e.g., aqua regia). Thermally stable polycrystalline diamond compacts in which substantially all catalyst material has been leached out from the diamond table have been reported to be thermally stable up to temperatures of about twelve hundred degrees Celsius (1200° C.).

Examples of conventional acid leaching processes are described in U.S. Pat. No. 6,410,085 to Griffin et al. (issued Jun. 25, 2002), U.S. Pat. No. 6,435,058 to Matthias et al. (issued Aug. 20, 2002), U.S. Pat. No. 6,481,511 to Matthias et al. (issued Nov. 19, 2002), U.S. Pat. No. 6,544,308 to Griffin et al. (issued Apr. 8, 2003), U.S. Pat. No. 6,562,462 to Griffin et al. (issued May 13, 2003), U.S. Pat. No. 6,585,064 to Griffin et al. (issued Jul. 1, 2003), U.S. Pat. No. 6,589,640 to Griffin et al. (issued Jul. 8, 2003), U.S. Pat. No. 6,592,985 to Griffin et al. (issued Jul. 15, 2003), U.S. Pat. No. 6,601,662 to Matthias et al. (issued Aug. 5, 2003), U.S. Pat. No. 6,739,214 to Matthias et al. (issued May 25, 2004), U.S. Pat. No. 6,749,033 to Matthias et al. (issued Jun. 15, 2004) and U.S. Pat. No. 6,797,326 to Matthias et al. (issued Sep. 28, 2004). However, such acid leaching processes are problematic because the acid compounds used therein are difficult to control in use, problematic to store, require prolonged exposure times under elevated temperature and, in addition, generate a substantial quantity of hazardous waste.

Furthermore, conventional acid leaching processes often result in non-uniform removal of the catalyst material caused by the aggressive action of the acid compounds on polycrystalline material of the polycrystalline diamond compacts. Such non-uniform removal may compromise durability and reduce temperature tolerance of the polycrystalline diamond compacts having the catalyst material removed from only a portion thereof. For example, removal of catalyst material using conventional acid leaching processes may results in spikes, valleys and variations that extend beyond a depth of the polycrystalline diamond compact to which removal of the catalyst material is desired.

BRIEF SUMMARY

In some embodiments, the present disclosure includes methods of forming a polycrystalline compact for use in an earth-boring tool. Such methods may include at least partially melting at least one of a silicate glass, an alkali metal salt, and a rare earth element to form a reactive material and introducing the reactive material to a polycrystalline compact comprising a catalyst material disposed in interstitial spaces between inter-bonded crystals of a polycrystalline material to remove at least a portion of the catalyst material.

In additional embodiments, the present disclosure includes methods of forming a polycrystalline compact cutting element for an earth-boring tool. Such methods may include forming a cutting element comprising a polycrystalline material and a catalyst material disposed in interstitial spaces between inter-bonded crystals of the polycrystalline material and removing at least a portion of the catalyst material from the interstitial spaces by exposing at least a portion of the polycrystalline material to at least one of a solution comprising acetic acid and a chemical plasma comprising an inert gas or an oxidizing agent.

Other features and advantages of the present disclosure will become apparent to those of ordinary skill in the art through consideration of the ensuing description, the accompanying drawings, and the appended claims.

BRIEF DESCRIPTION OF THE DRAWINGS

While the specification concludes with claims particularly pointing out and distinctly claiming which are regarded as embodiments of the present disclosure, the advantages of embodiments of the present disclosure may be more readily ascertained from the following description of embodiments of the present disclosure when read in conjunction with the accompanying drawings in which:

DETAILED DESCRIPTION

Figure 1:
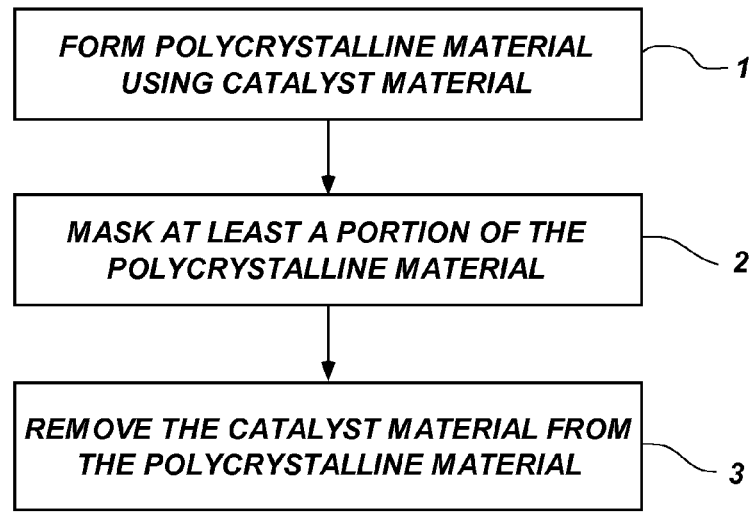
FIG. 1 is a flowchart of an embodiment of a method of forming a polycrystalline compact cutting element according to the present disclosure.

The illustrations presented herein are not meant to be actual views of any particular material, apparatus, system, or method, but are merely idealized representations which are employed to describe the present disclosure. Additionally, elements common between figures may retain the same numerical designation.

In some embodiments, methods of the present disclosure may be used to fabricate polycrystalline diamond compact (PDC) cutting elements for use in earth-boring tools, such as drill bits. The methods employ the use of a non-acidic, reactive material to remove catalyst material from the polycrystalline material of the PDC that forms the cutting element. The polycrystalline material may be formed using a high temperature/high pressure (HTHP) process. In some embodiments, the polycrystalline material may be formed on a cutting element substrate, or the polycrystalline material may be formed separately from any cutting element substrate and later attached to a cutting element substrate. The reactive material may include, for example, a molten glass, an ionic compound, a leaching liquor or a chemical plasma. Removing the catalyst material from the polycrystalline material using the non-acidic, reactive materials disclosed herein may provide improved control of a depth at which the catalyst material is removed.

As used herein, the term "catalyst material" refers to any material that is capable of substantially catalyzing the formation of inter-granular bonds between grains of hard material during an HTHP but at least contributes to the degradation of the inter-granular bonds and granular material under elevated temperatures, pressures, and other conditions that may be encountered in a drilling operation for forming a wellbore in a subterranean formation. For example, catalyst materials for diamond include, by way of example only, cobalt, iron, nickel, other elements from Group VIIIA of the Periodic Table of the Elements, and alloys thereof.

As used herein, the term "drill bit" means and includes any type of bit or tool used for drilling during the formation or enlargement of a wellbore and includes, for example, rotary drill bits, percussion bits, core bits, eccentric bits, bi-center bits, reamers, mills, drag bits, roller cone bits, hybrid bits and other drilling bits and tools known in the art.

As used herein, the term "molten" means and includes a state in which a material is viscous and in a softened or melted state through which the material passes in transitioning from a solid state to a liquid state.

As used herein, the term "hard material" means and includes any material having a Knoop hardness value of about 3,000 Kg/mm$^2$ (29,420 MPa) or more. Hard materials include, for example, diamond and cubic boron nitride.

As used herein, the term "inter-granular bond" means and includes any direct atomic bond (e.g., covalent, metallic, etc.) between atoms in adjacent grains of material.

As used herein, the term "polycrystalline compact" means and includes any structure comprising a polycrystalline material formed by a process that involves application of pressure (e.g., compaction) to the precursor material or materials used to form the polycrystalline material.

As used herein, the term "polycrystalline material" means and includes any material comprising a plurality of grains or crystals of the material that are bonded directly together by inter-granular bonds. The crystal structures of the individual grains of the material may be randomly oriented in space within the polycrystalline material.

As used herein, the term "leaching" means and includes removing or extracting materials from a solid material (such as a polycrystalline material) into a carrier, such as by dissolving the materials into the carrier or by converting the materials into a salt.

As used herein with regard to a depth or level, or magnitude of a depth of level, that catalyst is removed beneath a surface of a polycrystalline compact, the term "standard deviation" means and includes a measure of dispersion or variation obtained by extracting the square root of the mean of squared deviations of observed values from their mean in a frequency distribution. A low standard deviation indicates that data points tend to be very close to the mean, whereas high standard deviation indicates that the data points are spread out over a large range of values. A reduced standard deviation may indicate that the observed depths of catalyst removal are closer to the mean and, thus, may be referred to herein as an improvement in the standard deviation (i.e., "improved standard deviation"). To determine an improvement in the standard deviation, a depth at which the catalyst is removed beneath a surface of the polycrystalline compact may be determined using conventional methods, such as, electron microscopy. Using the methods described herein, the standard deviation may be improved, for example, by up to about 80% and, more particularly, by between about 5% and about 20%.

As used herein with regard to a depth or level, or magnitude of a depth of level, beneath a surface of a polycrystalline compact, the terms "substantially uniform" and "substantially uniformly" mean and include a depth of an area under the surface which is substantially devoid of significant aberrations such as spikes and/or valleys in excess of a general magnitude of such depth. More specifically, a "substantially uniform depth" when referring to a depth of catalyst removal beneath a surface of a polycrystalline compact means and includes a depth of such removal substantially free of significant aberrations such as spikes, valleys and other variations in the region below the surface. In other words, if catalyst is removed to a substantially uniform depth below, for example, a cutting face of a polycrystalline compact, the catalyst is removed from an area below the surface of the cutting face to a depth, the boundary of which with a remainder of the compact including such catalyst while not necessarily constant, is free of significant aberrations such as spikes, valleys and/or other variations.

Figure 2A:
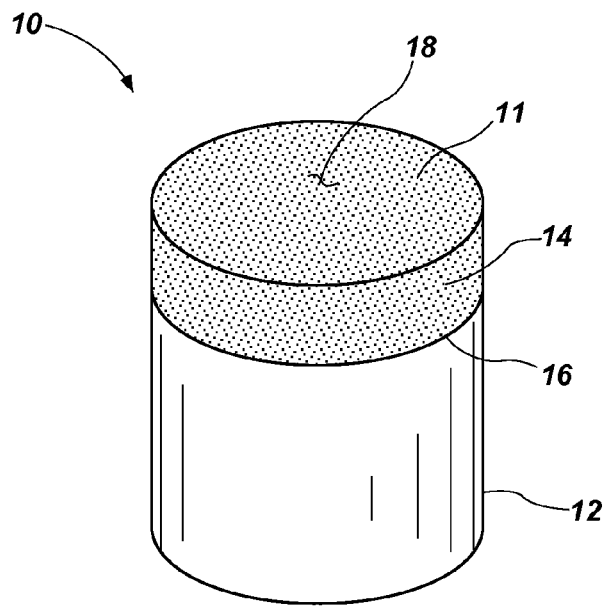
FIGS. 2A through 2C are illustrations depicting a method of forming a polycrystalline compact cutting element according to the embodiment of FIG. 1.
Figure 2B:
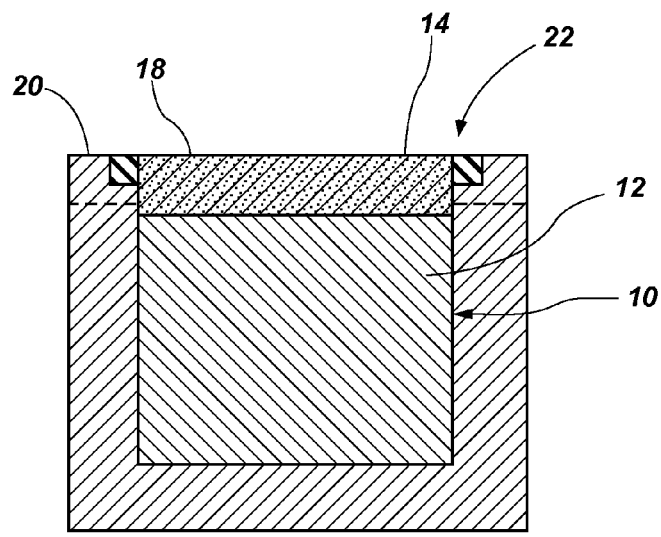
Figure 2C:
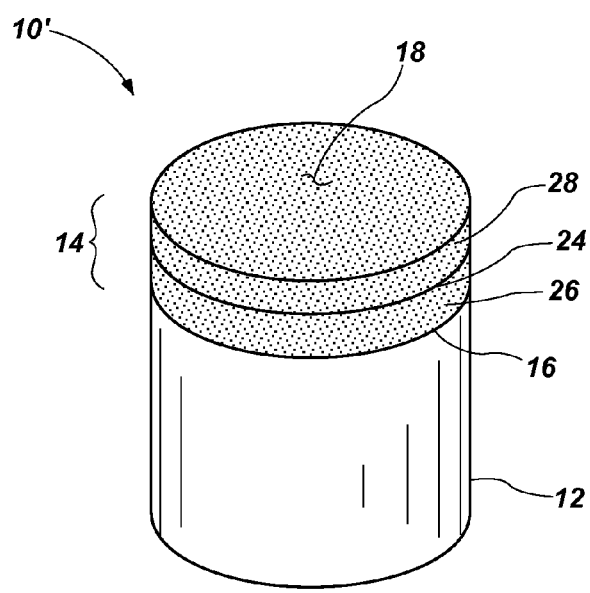

FIG. 1 is a process flow of an embodiment of a method of the present disclosure. The associated structures formed during the process shown in FIG. 1 are illustrated in FIGS. 2A through 2C. Referring to the foregoing drawing figures, in a first act 1, a cutting element 10 (FIG. 2A) that includes a polycrystalline material 14 is formed from particles of a hard material, such as diamond particles (also known as "grit") in the presence of a catalyst material 11 using an HTHP process. In some embodiments, the polycrystalline material 14 may be formed on a supporting substrate 12, or may be attached to the supporting substrate 12 after formation of the polycrystalline material 14. The substrate 12 may comprise a cermet material such as cobalt-cemented tungsten carbide. In a second act 2, a mask, such as fixture 20 (FIG. 2B), may be formed over the substrate 12 and, optionally, a portion of the polycrystalline material 14 of the cutting element 10. In a third act 3, at least a portion of the catalyst material 11 may be removed from exposed regions of the polycrystalline material 14 using a non-acidic, reactive material, such as a molten glass material, an ionic compound, a leaching liquor or a chemical plasma, as will be described herein (FIG. 2C). Controlled removal of the catalyst material 11 using the reactive material may improve (i.e., reduce) a standard deviation of a depth at which the catalyst material 14 is removed from beneath a surface of PCD cutting elements, such as cutting element 10. As used herein, the term "remove" as applied to catalyst material 11 within the polycrystalline material 14 means and includes substantial removal of catalyst 11 from interstitial spaces within the polycrystalline material 14 and from surfaces of the bonded particles of which the polycrystalline material 14 is comprised, and does not preclude the existence of some small quantity of catalyst material 11 within the region or regions of the polycrystalline material 14 from which the catalyst material 11 has been removed. Stated another way, the polycrystalline material 14 may have a region or regions, or even the entirety of the polycrystalline material 14, which are rendered substantially free of catalyst material 11 by a removal process according to an embodiment of the disclosure. For example, the standard deviation of the depth at which the catalyst material 11 is removed may be improved by between about 5% and about 80%, more particularly, between about 10% and about 20% and, more particularly still, about 15%. By way of example and not limitation, the reactive material may enable the catalyst material 11 to be substantially uniformly removed from the polycrystalline material 14.

FIGS. 2A through 2C illustrate an embodiment of a method of the present disclosure. FIG. 2A is a perspective view of a cutting element 10 that may be used, for example, in an earth-boring tool. The cutting element 10 may include a polycrystalline material 14, also referred to in the art as a "polycrystalline diamond table" or a "diamond table." The polycrystalline material 14 of the cutting element 10 may include a plurality of interstitial regions throughout which a catalyst material 11 is dispersed. The cutting element 10, 10' shown in FIGS. 2A though 2C is formed on a supporting substrate 12 (as shown) of cemented tungsten carbide or other suitable material as known in the art in a conventional process of the type described, by way of non-limiting example, in U.S. Pat. No. 3,745,623 to Wentorf et al. (issued Jul. 17, 1973), or may be formed as a freestanding polycrystalline diamond compact (i.e., without the supporting substrate 12) in a similar conventional process as described, by way of non-limiting example, in U.S. Pat. No. 5,127,923 to Bunting et al. (issued Jul. 7, 1992), the disclosure of each of which is incorporated herein in its entirety by this reference. The polycrystalline material 14 may be bonded to the supporting substrate 12 at an interface 16. A cutting surface 18 of the polycrystalline material 14 may be exposed opposite interface 16 as a working surface. While the cutting element 10 in the embodiment depicted in FIG. 2A is cylindrical or disc-shaped, in other embodiments, the cutting element 10 may have any desirable shape, such as a dome, cone, chisel, etc. The polycrystalline material 14 may comprise natural diamond, synthetic diamond, or a mixture thereof, and may be formed using diamond grit of different crystal sizes (i.e., from multiple layers of diamond grit, each layer having a different average crystal size or by using a diamond grit having a multi-modal crystal size distribution).

As shown in FIG. 2B, the cutting element 10 may be masked to protect or shield the substrate 12 and, optionally, a portion of the polycrystalline material 14 during removal of the catalyst material 11. The cutting element 10 may be masked using a material impervious to the reactive material. For example, the cutting element 10 may be disposed in a fixture 20 to mask the substrate 12 and a portion of the polycrystalline material 14, if desired. In some embodiments, the fixture 20 may be formed from a heat resistant material, such as a ceramic material, a metal material or a metal alloy, or may be formed from a chemical resistant material, such as a polymer material or graphite. As a non-limiting example, the cutting element 10 may be fitted in a recess 22 in the fixture 20 by a shrink-fitting process. The cutting element 10 may be disposed in the recess 22 of the fixture 20 such that the cutting surface 18 of the polycrystalline material 14 is exposed. Heat may then be applied to the cutting element 10 within the fixture 20 to cause expansion of the cutting element 10. As the cutting element 10 and fixture 20 cool to room temperature, a diameter of the recess 22 in the fixture 20 may be slightly smaller than a diameter of the cutting element 10. The fixture 20 may be used to shield portions of the cutting element 10 when exposure to the reactive material is not desired, including the supporting substrate 12 and, optionally, a portion of the polycrystalline material 14. While both the substrate 12 and the polycrystalline material 14 of the cutting element 10 are disposed in the fixture 20 in the embodiment depicted in FIG. 2B, in other embodiments, the polycrystalline material 14 of the cutting element 10, or a portion thereof, may protrude above the fixture 20, as shown in broken lines, such that sidewalls of the polycrystalline material 14 are exposed for removal of the catalyst material therefrom concurrently with removal of the catalyst material 11 from the cutting surface 18. The resulting area of polycrystalline material 14 in such an instance may be said to form a "cap-like" structure of polycrystalline material 14 from which catalyst material 11 has been removed.

FIG. 2C illustrates the cutting element 10' after removal of the catalyst material 11 (FIG. 2A) from at least a portion of the polycrystalline material 14. In some embodiments, at least a portion of or substantially all of the catalyst material 11 may be removed from the polycrystalline material 14. In other embodiments, the catalyst material 11 is removed from portions of the polycrystalline material 14 surrounding the cutting surface 18, as shown in FIG. 2C, and the polycrystalline material 14 may include two general regions separated at an interface 24. A catalyst-filled portion 26 forms the lower portion of the polycrystalline material 14 and may be bonded to the supporting substrate 12. A leached portion 28 forms the upper portion of the polycrystalline material 14 and is adjoined to catalyst-filled portion 26 at interface 24. The leached portion 28 of the polycrystalline material 14 provides a thermally stable cutting surface 18. In some embodiments, the leached portion 28 includes a polycrystalline material 14 having interstitial regions, at least a portion of which are substantially free of catalyst material 11. The presently disclosed methods enable an improvement in the standard deviation (i.e., a reduction in an amount of variation) of removal of the catalyst material 11 from the polycrystalline material 14, to a desired depth or depths. In other words, in cutting elements subjected to conventional acid leaching processes, the methods of the present disclosure may provide an improvement in the standard deviation of removal of the catalyst material 11 from within the polycrystalline material 14 of PDC cutting elements. For example, the standard deviation of the depth of the leached portion 28 between cutting elements formed using the methods of the present disclosure may be improved by about 10% in comparison to a standard deviation in depth of leached portions formed using conventional acid leaching processes. In addition, the catalyst material 11 may be substantially uniformly removed from the cutting surface 18 of the polycrystalline material 14 and, optionally, from the sidewalls of the polycrystalline material 14. In some embodiments, the catalyst material 11 may be removed from a region having a substantially uniform depth from the cutting surface 18 or the sidewalls of the polycrystalline material 14. Accordingly, removal of the catalyst material 11 using the reactive material as described herein may reduce or eliminate the number and depth of spikes or variations of the leached portion 28 that extend past a desired depth of the interface 24 between the catalyst-filled portion 26 and the leached portion 28. For example, if the polycrystalline material 14 has a depth of between about 1 mm and about 3 mm, in one embodiment the catalyst material 11 may be removed or leached from the polycrystalline material 14 to a depth of less than about one hundred micrometers (100 μm or 0.1 mm) and, more particularly, between about twenty five micrometers (25 μm or 0.025 mm) and about ninety-five micrometers (95 μm or 0.095 mm). In another embodiment, the catalyst material may be removed to a depth of more than about one hundred micrometers (100 μm, or 0.1 mm), for example, to as much as five hundred micrometers (500 μm or 0.5 mm) or, in one case, to a depth selected from within a range of between about two hundred fifty micrometers (250 μm or 0.25 mm) and about three hundred micrometers (300 μm or 0.3 mm).

The catalyst material 11 may be removed from the interstices of the polycrystalline material 14 to form the thermally stable cutting surface 18 by exposing the polycrystalline material 14 to a reactive material. The reactive material may include, for example, a molten glass, a molten salt, a leaching liquor, a eutectic liquid or a chemical plasma. In some embodiments, the polycrystalline material 14 or the cutting surface 18 thereof may be exposed to the reactive material while the cutting element 10 is disposed within the fixture 20 to preclude contact between the reactive material and a shielded region of the polycrystalline material 14 and the supporting substrate 12, if present.

In some embodiments, the reactive material may include a glass material in a molten state. The glass material may be a silicate glass, such as a borosilicate glass, an aluminosilicate glass, a high silica glass, phosphosilicate glass (PSG) or borophosphosilicate glass (BPSG). In some embodiments, a sodium material (also referred to as a "flux material") may be added to the glass material to substantially reduce a melting point of the glass material. The sodium material may include, for example, sodium hydroxide, sodium carbonate, sodium borohydrate or sodium chloride. By way of non-limiting example, the glass material may have a melting point of less than or equal to about one thousand degrees Celsius (1,000° C.) and, more particularly, between about twenty degrees Celsius (20° C.) and about nine hundred degrees Celsius (900° C.) and, more particularly still, between about three hundred degrees Celsius (300° C.) and about seven hundred fifty degrees Celsius (750° C.). In some embodiments, the glass material may be introduced to the cutting element 10 at a temperature of greater than or equal to about a melting point of the glass material. By way of non-limiting example, the glass material may be introduced to the polycrystalline material 14 of the cutting element 10 in a chamber (not shown) of a conventional furnace or reactor. A temperature within the chamber may be controlled to maintain the glass material in a molten state during the removal of the catalyst material 11 from the polycrystalline material 14. In other embodiments, the glass material may be heated to a molten state and the polycrystalline material 14 of the cutting element 10 may be immersed in the molten glass material or may be inverted and dipped into the molten glass material. In the molten state, the glass material may corrode, dissolve or otherwise remove the catalyst material 11 from a portion of the polycrystalline material 14 such that at least a portion of the interstices of the portion of the polycrystalline material 14 are substantially free of catalyst material 11.

In other embodiments, the reactive material may include an ionic compound such as, a salt, a mixture of salts or a mixture of compounds that may produce a salt. The ionic compounds may be selected to selectively dissolve the catalyst material 11 with respect to the polycrystalline material 14. The ionic compound may be a salt of, for example, an alkali metal (i.e., elements from Group I of the Periodic Table of the Elements), such as lithium, sodium, potassium, rubidium, cesium, and francium or may be a salt of calcium, silica or aluminum. The ionic compound may also be a nitrate, a fluoroborate, an ethanoate, a hexafluorophosphate or a halide. The ionic compound may have a melting temperature of less than or equal to four hundred degrees Celsius (400° C.) and, more particularly, between about twenty degrees Celsius (20° C.) and about three hundred degrees Celsius (300° C.). The cutting element 10 may be exposed to the ionic compound at a pressure of less than or equal to five kilobar (5 kbar) and, more particularly, between about one-half of a kilobar (0.5 kbar) and about three kilobar (3 kbar). To remove the catalyst material 11 from the polycrystalline material 14, the ionic compound may be introduced to the polycrystalline material 14 at a temperature of greater than or equal to a melting point of the ionic compound. For example, the ionic compound may be heated to a molten state and the cutting element 10 may be immersed or dipped into the molten ionic compound. The molten ionic compound may corrode, dissolve or otherwise remove the catalyst material 11 from a portion of the polycrystalline material 14 such that the interstices of the portion of the polycrystalline material 14 are substantially free of catalyst material 11.

In additional embodiments, the reactive material may include a leaching liquor that may dissolve the catalyst material 11 enabling removal of the catalyst material 11 from the cutting element 10. As used herein, the term "leaching liquor" means and includes liquid that may remove the catalyst material 11 from the polycrystalline material 14 by, for example, dissolving the catalyst material 11 or converting the catalyst material into a soluble salt. Suitable leaching liquors are known in the art and are described, by way of non-limiting example, in U.S. Pat. No. 3,673,154 to Treyvillyan et al. (issued Jun. 27, 1972) and U.S. Pat. No. 4,490,298 to Feld et al. (issued Dec. 25, 1984), the disclosure of each of which is incorporated herein in its entirety by this reference. For example, the catalyst material 11 may be exposed to a leaching liquor formed by liquid phase oxidation of meta- or para-xylenes to isophthalic acid or terephthalic acid, with an oxidation catalyst (e.g., cobalt acetate) in the presence of an acetic acid solvent medium, which may dissolve the catalyst material 11 and form a phthalic acid. The phthalic acid, the acetic acid and water may be removed from the reaction mixture and the resulting mixture may be treated with aqueous sodium carbonate such that a carbonate of the catalyst material 11 is formed. As another non-limiting example, the catalyst material 11 may be exposed to a solution of acetic acid and water and, thereafter, an oxalic acid or oxalic acid ester may be added to the solution to form an oxalate of the catalyst material 11.

In further embodiments, the reactive material may be introduced to the polycrystalline material 14 of the cutting element 10 in the form of a liquid fowling eutectic reaction. In some embodiments, a binary eutectic may be formed by one or more rare earth elements, such as, germanium, yttrium, neodymium, cerium, and gadolinium. As a non-limiting example, the one or more elements may be liquefied by heating the one or more elements to a temperature of greater than or equal to a melting point thereof. For example, a germanium metal may be liquefied by heating to a temperature of about nine hundred thirty-eight degrees Celsius (938° C.). The liquefied element, such as liquid germanium, may be combined with about 15 wt % cobalt and cooled to a temperature of about seven hundred thirty degrees Celsius (730° C.) to form a eutectic liquid, which remains a liquid as described in the phase diagram relation between cobalt and germanium. The phase diagram relation between cobalt and germanium is described in detail in, for example, K. Ishida and T. Nishizawa, *Journal of Phase Equilibria*, vol. 12, No. 1, pp. 77-83 (1991), the entirety of which is incorporated herein by this reference. The cutting element 10 may be exposed to the eutectic liquid at a pressure of less than or equal to about five kilobar (5 kbar) and, more particularly, between about one-half of a kilobar (0.5 kbar) and about three kilobar (3 kbar). To remove the catalyst material 11 from the polycrystalline material 14, the eutectic liquid may be introduced to the polycrystalline material 14 at a temperature of greater than or equal to a melting point of an eutectic liquid phase. For example, after forming the eutectic liquid, the cutting element 10 may be immersed or dipped into the eutectic liquid, which may be maintained in a molten state. The molten eutectic liquid may corrode, dissolve or otherwise remove the catalyst material 11 from a portion of the polycrystalline material 14 such that the interstices of the portion of the polycrystalline material 14 are substantially free of catalyst material 11.

In yet further embodiments, the reactive material may be introduced to the polycrystalline material 14 of the cutting element 10 in the form of a chemical plasma. In some embodiments, the chemical plasma may include one or more inert gases, such as, argon, nitrogen, helium, xenon, krypton and radon. In other embodiments, the chemical plasma may include an oxidizing agent, such as oxygen ($O_2$), ozone ($O_3$), fluorine ($F_2$), chlorine ($Cl_2$), peroxides, and the like. The chemical plasma may be generated as known in the art in a conventional process of the type described, by way of non-limiting example, in U.S. Pat. No. 4,494,620 to Matsuo et al. (issued Jan. 8, 1985), U.S. Pat. No. 4,361,472 to Morrison (issued Nov. 30, 1982), and H. Conrads and M. Schmidt, "Plasma Generation and Plasma Sources," *Plasma Sources Sci. Technol.* 9:441-454 (2000), the disclosure of each of which is incorporated herein in its entirety by this reference. The cutting element 10 may be placed in a chamber of a conventional plasma reactor and the chamber may be at least partially evacuated. One or more of the inert gases and the oxidizing agents may then be introduced into the plasma reactor and the chamber. The chemical plasma may be generated in a microwave electric field or in a high-frequency electric field under a reduced pressure. The polycrystalline material 14 may be used as a sputtering target and ions in the chemical plasma may bombard the catalyst material 11 resulting in ejection of the catalyst material 11 from the interstitial regions of the polycrystalline material 14. As a non-limiting example, an electric field may be used to direct the ejected catalyst material 11 away from the cutting surface 18 of the polycrystalline material 14 and toward a dummy plating material. By way of non-limiting example, the chemical plasma may be contacted with the polycrystalline material 14 at a temperature of between about three hundred degrees Celsius (300° C.) and about seven hundred fifty degrees Celsius (750° C.).

While the cutting element 10 may be exposed to the reactive material at a temperature of less than about four hundred degrees Celsius (400° C.) to prevent internal stress, the temperature of the reactive material may be increased to less than or equal to about seven hundred fifty degrees Celsius (750° C.) to increase a rate of removal of the catalyst material 11 from the polycrystalline material 14. The cutting elements 10, 10' formed according to embodiments of methods of the present disclosure may provide reduce the variation (i.e., the standard deviation) in depth of removal of the catalyst material 11 from the polycrystalline material 14 of PDC cutting elements in comparison to the variation in the depth of removal of the catalyst material from PCD cutting elements using conventional acid leaching process. For example, the standard deviation of the depth of removal of the catalyst material 11 throughout the polycrystalline material 14 of PDC cutting elements (i.e., cutting element 10) may be reduced by between about 15% and about 20%. In addition, removal of the catalyst material 11 using the methods of the present disclosure may enable formation of the leached portion 28 extending to a desired depth within the polycrystalline material 14 without significant spikes or variations extending therepast. Forming the cutting element 10 according to embodiments of the present disclosure enables removal of the catalyst material 11 from the polycrystalline material 14 at reduced temperatures to prevent reverse graphitization of the polycrystalline material 14. Furthermore, forming the cutting element 10 according to embodiments of the present disclosure substantially reduces or eliminates hazardous acid wastes that are produced during conventional acid leaching processes.

Figure 3A:
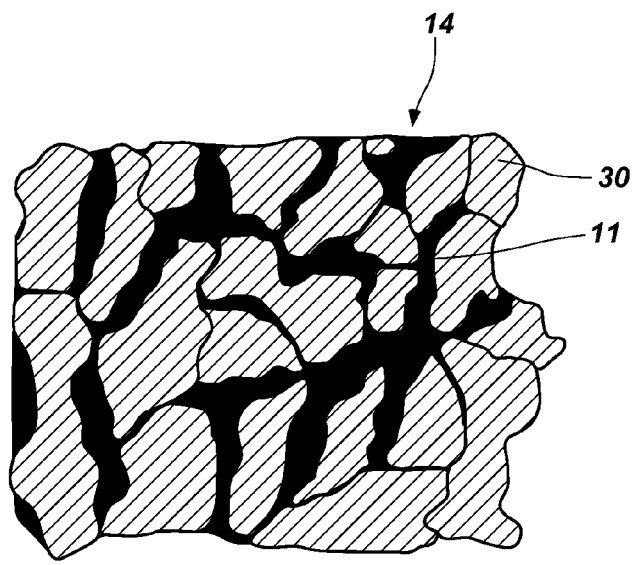
FIG. 3A is a simplified figure illustrating how a microstructure of a region or layer of polycrystalline material of the cutting element shown in FIGS. 2A and 2B may appear under magnification.

FIG. 3A is an enlarged view illustrating how a microstructure of the polycrystalline material 14 shown in FIGS. 2A and 2B may appear under magnification. As shown in FIG. 3A, the polycrystalline material 14 includes diamond crystals 30 that are bonded together by inter-granular diamond-to-diamond bonds. The catalyst material 11 used to catalyze the formation of the inter-granular diamond-to-diamond bonds is disposed in interstitial regions or spaces between the diamond crystals 30.

Figure 3B:
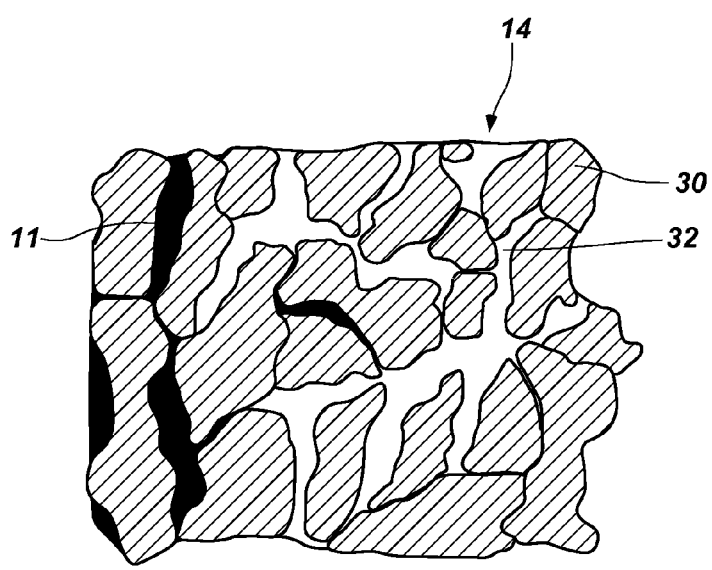
FIG. 3B is a simplified figure illustrating how a microstructure of a region or layer of polycrystalline material of the cutting element shown in FIG. 2C may appear under magnification.

FIG. 3B is an enlarged view illustrating how a microstructure of the polycrystalline material 14 shown in FIG. 2C may appear under magnification. As shown in FIG. 3B, after removal of at least a portion of the catalyst material 11 using embodiments of the methods described herein, cavities or voids 32 may be present in interstitial regions or spaces between the diamond crystals 30. The methods disclosed herein enable removal of the catalyst material 11 from the polycrystalline material 14 at temperatures of less than or equal to seven hundred fifty degrees Celsius (750° C.), which prevents internal stress within the cutting element (e.g., reverse graphitization) caused by increased temperatures.

Figure 4:
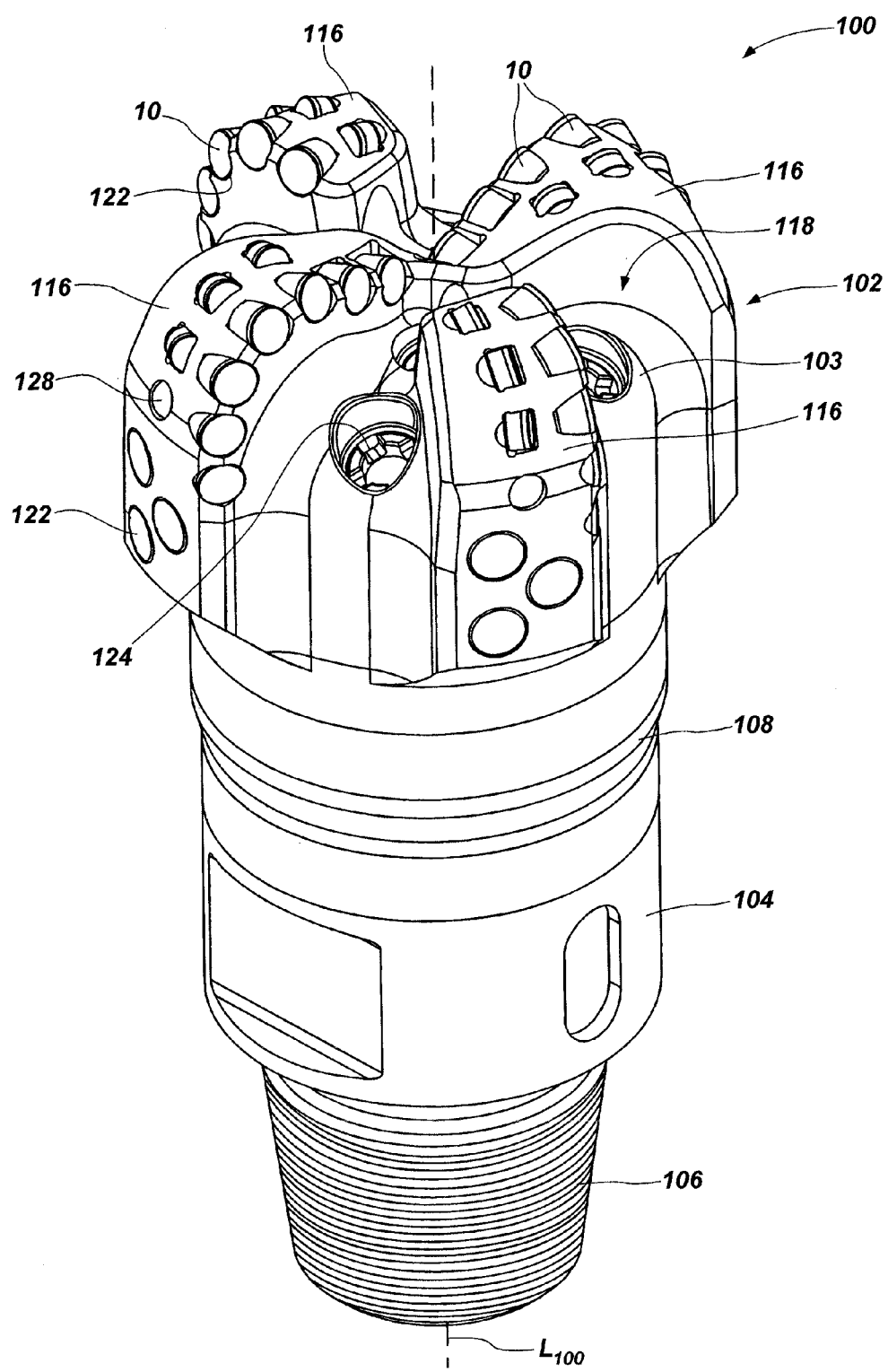
FIG. 4 is a perspective view of an embodiment of an earth-boring tool of the present disclosure that includes a plurality of cutting elements formed in accordance with embodiments of the present disclosure.

FIG. 4 is a perspective view of an embodiment of an earth-boring rotary drill bit 100 of the present disclosure that includes a plurality of cutting elements 10 having a structure as shown in FIG. 2C, or other polycrystalline material structure having catalyst removed from one or more portions thereof according to the disclosure. The earth-boring rotary drill bit 100 includes a bit body 102 that is secured to a shank 104 having a threaded connection portion 106 (e.g., an American Petroleum Institute (API) threaded connection portion) for attaching the drill bit 100 to a drill string (not shown). In some embodiments, such as that shown in FIG. 4, the bit body 102 may comprise a particle-matrix composite material, and may be secured to the metal shank 104 using an extension 108. In other embodiments, the bit body 102 may be secured to the shank 104 using a metal blank embedded within the particle-matrix composite bit body 102, or the bit body 102 may be secured directly to the shank 104.

The bit body 102 may include internal fluid passageways (not shown) that extend between a face 103 of the bit body 102 and a longitudinal bore (not shown), which extends through the shank 104, the extension 108, and partially through the bit body 102. Nozzle inserts 124 also may be provided at the face 103 of the bit body 102 within the internal fluid passageways. The bit body 102 may further include a plurality of blades 116 that are separated by junk slots 118. In some embodiments, the bit body 102 may include gage wear plugs 122 and wear knots 128. A plurality of cutting elements 10', as previously disclosed herein, may be mounted on the face 103 of the bit body 102 in cutting element pockets 112 that are located along each of the blades 116. The cutting elements 10 are positioned to cut a subterranean formation being drilled while the drill bit 100 is rotated under weight-on-bit (WOB) in a borehole about centerline $L_{100}$.

Embodiments of cutting elements of the present disclosure also may be used as gauge trimmers, and may be used on other types of earth-boring tools. For example, embodiments of cutting elements of the present disclosure also may be used on cones of roller cone drill bits, on reamers, mills, bi-center bits, eccentric bits, coring bits, and so-called "hybrid bits" that include both fixed cutters and rolling cutters.

While the present disclosure has been described herein with respect to certain embodiments, those of ordinary skill in the art will recognize and appreciate that it is not so limited. Rather, many additions, deletions and modifications to the described embodiments may be made without departing from the scope of the disclosure as hereinafter claimed, including legal equivalents. In addition, features from one embodiment may be combined with features of another embodiment while still being encompassed within the scope of the disclosure as contemplated by the inventors.

What is claimed is:

1. A method of forming a polycrystalline compact for use in an earth-boring tool, comprising:
   at least partially melting at least one of a silicate glass, an alkali metal salt, and a rare earth element to form a reactive material;
   introducing the reactive material to a polycrystalline compact comprising a plurality of interstitial spaces between inter-bonded crystals of a polycrystalline material throughout which interstitial spaces a catalyst material is dispersed; and
   removing at least a portion of the catalyst material with the reactive material from at least a portion of the plurality of interstitial spaces.

2. The method of claim 1, further comprising, before introducing the reactive material to the polycrystalline compact, forming a mask over at least a portion of at least one surface of the polycrystalline compact, the mask comprising a material impervious to the reactive material.

3. The method of claim 1, wherein at least partially melting at least one of a silicate glass, an alkali metal salt, and a rare earth element to form a reactive material comprises at least partially melting at least one of a borosilicate glass, an aluminosilicate glass, a phosphosilicate glass, and a borophosphosilicate glass to form the reactive material.

4. The method of claim 1, wherein at least partially melting at least one of a silicate glass, an alkali metal salt, and a rare earth element to form a reactive material comprises heating the at least one of the silicate glass, the alkali metal salt, and the rare earth element to a temperature of greater than or equal to a melting point thereof.

5. The method of claim 1, wherein at least partially melting at least one of a silicate glass, an alkali metal salt, and a rare earth element to form a reactive material comprises at least partially melting an alkali salt comprising at least one of lithium, sodium, potassium, rubidium, cesium, francium, calcium, silica, and aluminum to form the reactive material.

6. The method of claim 1, wherein introducing the reactive material to a polycrystalline compact comprises introducing a reactive material comprising a molten lithium salt to the polycrystalline compact comprising a plurality of interstitial spaces between inter-bonded crystals of a polycrystalline material throughout which interstitial spaces, a catalyst material comprising cobalt is dispersed.

7. The method of claim 1, wherein introducing the reactive material to a polycrystalline compact comprises introducing a molten silicate glass to the polycrystalline compact comprising a plurality of interstitial spaces between inter-bonded crystals of a polycrystalline material throughout which interstitial spaces, a catalyst material comprising cobalt is dispersed.

8. The method of claim 7, wherein introducing a molten silicate glass to the polycrystalline compact comprising a plurality of interstitial spaces between inter-bonded crystals of a polycrystalline material throughout which interstitial spaces, a catalyst material comprising cobalt is dispersed comprises introducing the molten silicate glass to the polycrystalline compact at a temperature of less than about 1000° C.

9. The method of claim 1, wherein introducing the reactive material to a polycrystalline compact comprising a plurality of interstitial spaces between inter-bonded crystals of a polycrystalline material throughout which interstitial spaces, a catalyst material is dispersed comprises introducing the alkali metal salt to a polycrystalline compact comprising a catalyst material at a temperature of less than or equal to 400° C.

10. A method of forming a polycrystalline compact for use in an earth-boring tool, comprising:
    at least partially melting a rare earth element to form a reactive material; and
    introducing the reactive material to a polycrystalline compact comprising a catalyst material disposed in interstitial spaces between inter-bonded crystals of a polycrystalline material to remove at least a portion of the catalyst material, wherein at least partially melting a rare earth element to form a reactive material comprises at least partially melting a plurality of rare earth elements to form a binary eutectic liquid.

11. The method of claim 10, wherein at least partially melting a plurality of rare earth elements to form a binary eutectic liquid comprises at least partially melting the plurality of rare earth elements to form at least one of a cobalt-germanium eutectic, cobalt-neodymium eutectic, cobalt-yttrium eutectic, cobalt-cerium eutectic, and cobalt-gadolinium eutectic.

12. A method of forming a polycrystalline compact cutting element for an earth-boring tool, comprising:
    forming a cutting element comprising a polycrystalline material and a catalyst material disposed in interstitial spaces between inter-bonded crystals of the polycrystalline material; and
    removing at least a portion of the catalyst material from the interstitial spaces by exposing at least a portion of the polycrystalline material to a chemical plasma comprising an inert gas or an oxidizing agent, wherein removing at least a portion of the catalyst material from the interstitial spaces by exposing at least a portion of the polycrystalline material to a chemical plasma comprises introducing at least one surface of the polycrystalline material to a chemical plasma comprising at least one of argon, nitrogen, helium, xenon, krypton, and radon.

13. The method of claim 12, wherein introducing at least one surface of the polycrystalline material to a chemical plasma comprising at least one of argon, nitrogen, helium, xenon, krypton, and radon comprises introducing at least one surface of the polycrystalline material to the chemical plasma at a temperature of between about 300° C. and about 750° C.

14. A method of forming a polycrystalline compact cutting element for an earth-boring tool, comprising:
    forming a cutting element comprising a polycrystalline material and a catalyst material disposed in interstitial spaces between inter-bonded crystals of the polycrystalline material; and
    removing at least a portion of the catalyst material from the interstitial spaces by exposing at least a portion of the polycrystalline material to a chemical plasma comprising an inert gas or an oxidizing agent, wherein removing at least a portion of the catalyst material from the interstitial spaces by exposing at least a portion of the polycrystalline material to a chemical plasma comprises introducing at least one surface of the polycrystalline material to a chemical plasma comprising at least one of oxygen, ozone, fluorine, chlorine, and a peroxide.

\* \* \* \* \*